Sept. 21, 1926.

J. W. CARR 1,600,312

PROTECTOR FOR PICKER STICKS

Filed Dec. 2, 1925

3 Sheets-Sheet 1

WITNESSES:

INVENTOR:
John W. Carr,
BY
ATTORNEY

Sept. 21, 1926.
J. W. CARR
1,600,312
PROTECTOR FOR PICKER STICKS
Filed Dec. 2, 1925   3 Sheets-Sheet 2
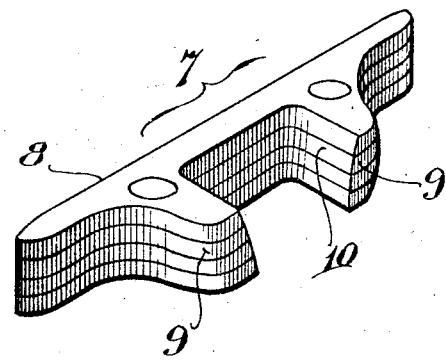
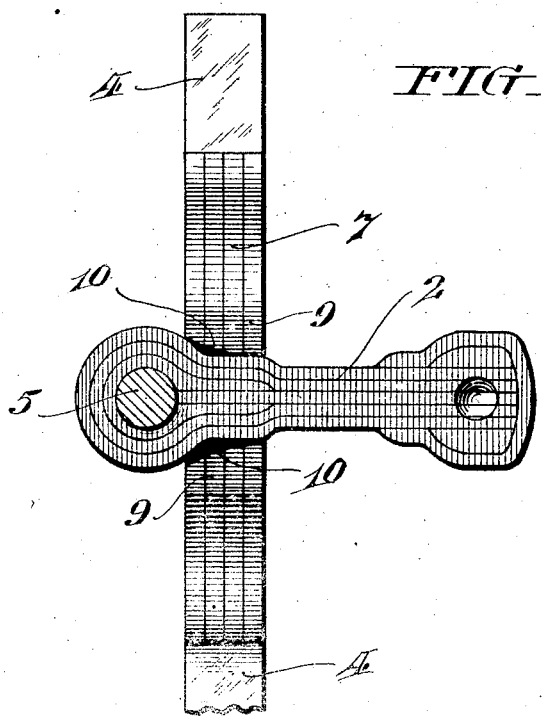
WITNESSES:
INVENTOR:
John W. Carr,
BY
ATTORNEY.

Sept. 21, 1926.

J. W. CARR

PROTECTOR FOR PICKER STICKS

Filed Dec. 2, 1925  3 Sheets-Sheet 3

WITNESSES:

INVENTOR:
John W. Carr;
BY
Joshua R. H. Potts
ATTORNEY.

Patented Sept. 21, 1926.

1,600,312

UNITED STATES PATENT OFFICE.

JOHN W. CARR, OF CHESTER, PENNSYLVANIA.

PROTECTOR FOR PICKER STICKS.

Application filed December 2, 1925. Serial No. 72,620.

My invention relates to looms and more particularly to protectors for picker sticks. As heretofore used the picker soon wears a notch in the part of the picker stick which engages the picker and the notch rapidly increases in depth and weakens the stick until it is too weak to stand the strain and splits from the notch downward. The picker stick is therefore short-lived.

The object of my invention is to provide simple and effective means for protecting that part of the picker stick which engages the picker and to thereby increase the life of the stick.

This object I attain in the following manner, reference being had to the accompanying drawings in which—

Figure 1:
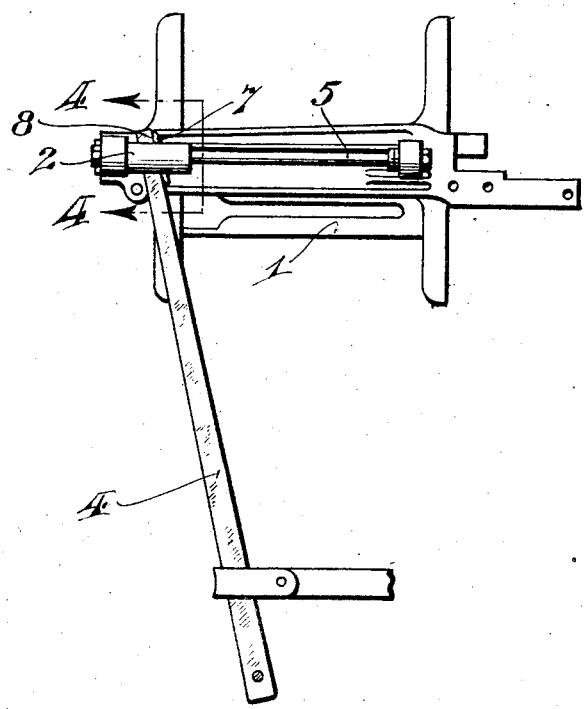
Figure 2:
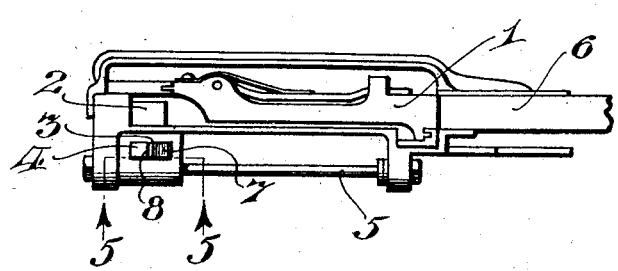
Figure 5:
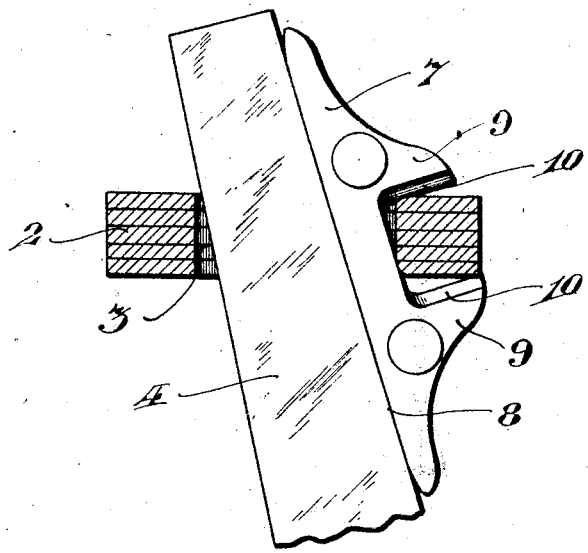
Figure 6:
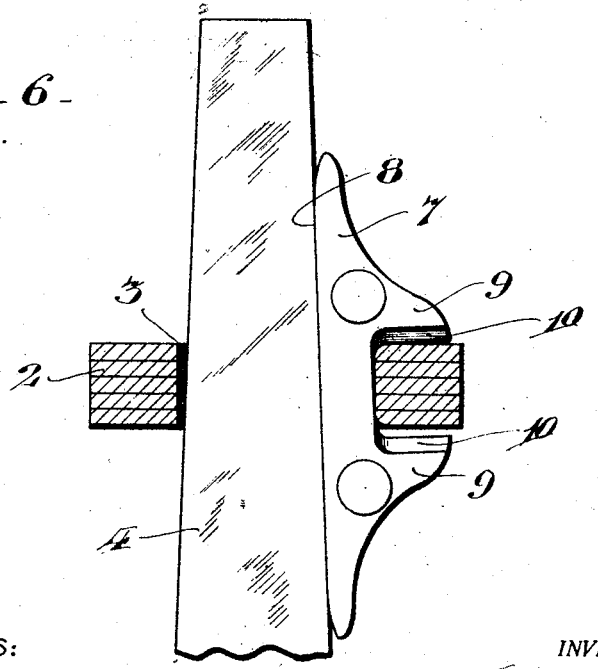

Figure 1 is a fragmentary side view of a shuttle box, picker stick and associated parts with novel protector applied thereto, Figure 2 a plan view of the same, Figure 3 a perspective view of the protector, Figure 4 a fragmentary section on line 4—4 of Figure 1, with some parts omitted, Figure 5 an enlarged fragmentary section on line 5—5 of Figure 2 with some parts omitted, and Figure 6 a like view with the parts in another position.

Referring to the drawings, 1 indicates a shuttle box, 2 the picker, which is provided with a slot 3 to receive the end of a picker stick 4, 5 a rod upon which the picker slides, 6 the shuttle guides and 7 my picker stick protector, which has a smooth rear surface 8 of material length upon which the picker stick may slide and two outwardly projecting lugs 9 adapted to loosely take over and under the part of the picker which is in front of slot 3. I prefer to form the lugs with their inner faces 10 converging from one side to the other in order that when used in connection with a picker of the usual shape these faces may be substantially parallel with the part of the picker surface which they embrace. The protector should be of a material which has a minimum of frictional resistance and a high degree of durability. I have found raw hide well adapted for the purpose.

The device is assembled by placing the protector in the slot of the picker with its lugs extending over and under that part of the picker which is in front of the slot, then placing the picker stick in the slot in the rear of the protector.

When the picker stick is swung to shoot a shuttle out of the shuttle box, the picker stick describes an arc while the picker slides in a straight line. With my protector in use the active face of the picker stick will slide upon the face 8 of the protector and the wear upon the picker stick will be distributed over a comparatively larger area of the face of the picker stick, thereby preventing the formation of a notch therein and largely increasing its life.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In combination with the picker and picker stick of a loom, a picker stick protector having one face adapted for sliding engagement with the picker stick and the opposite face adapted to loosely engage with the picker.

2. In combination with the picker and picker stick of a loom, a picker stick protector having one face adapted for sliding engagement with the picker stick and the opposite face provided with lugs adapted to loosely take over and under the picker.

3. In combination with the picker and picker stick of a loom, a picker stick protector having one face adapted for sliding engagement with the picker stick and the opposite face provided with lugs adapted to loosely take over and under that part of the picker which is in front of the picker stick, the inner faces of the lugs being formed to converge.

In testimony whereof I have signed my name to this specification.

JOHN W. CARR.